UNITED STATES PATENT OFFICE.

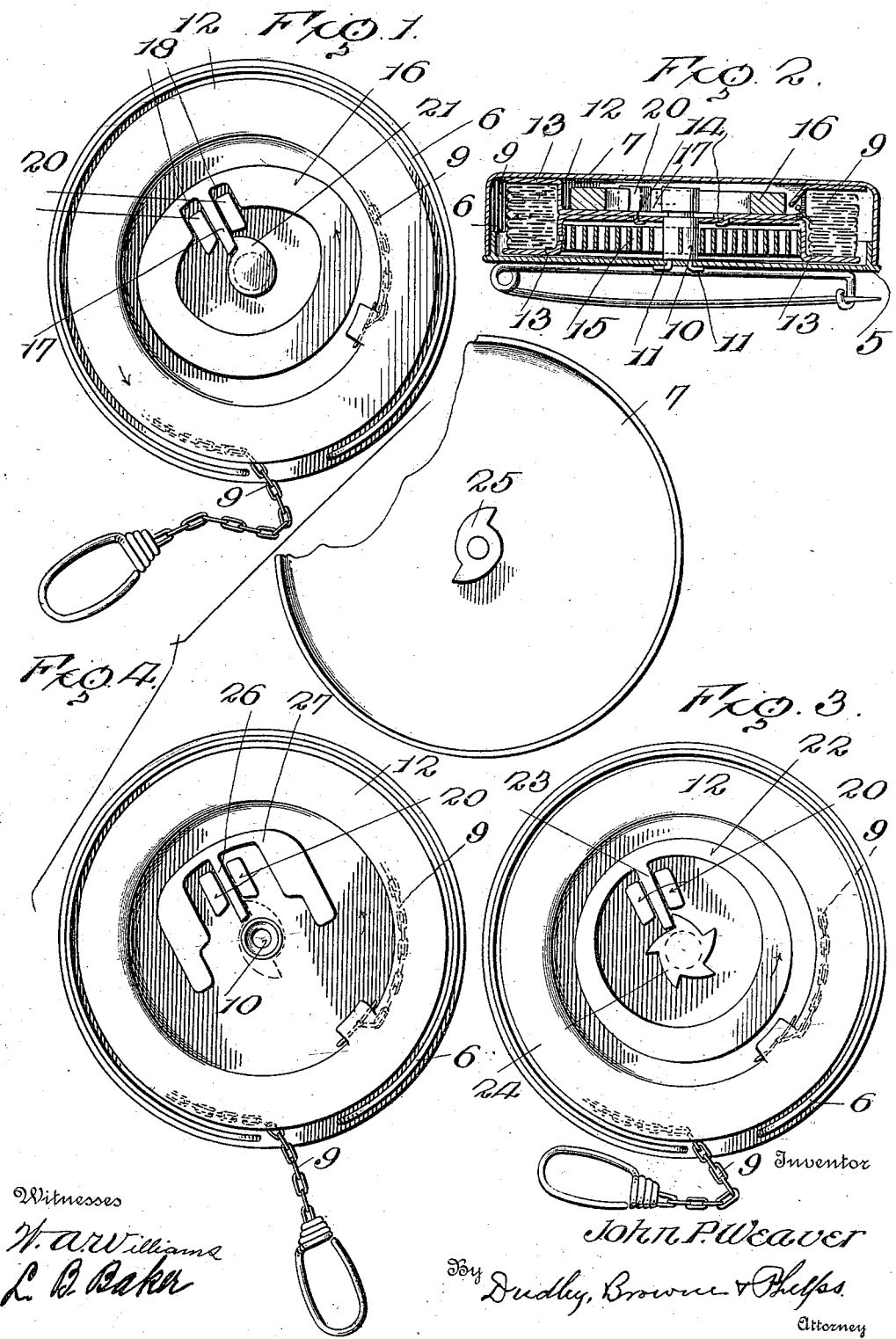

JOHN P. WEAVER, OF TERRE HAUTE, INDIANA.

REEL-HOLDER.

984,627.  Specification of Letters Patent.  Patented Feb. 21, 1911.

Application filed February 18, 1910. Serial No. 544,690.

*To all whom it may concern:*

Be it known that I, JOHN P. WEAVER, a citizen of the United States, residing at Terre Haute, in the county of Vigo and State of Indiana, have invented certain new and useful Improvements in Reel-Holders, of which the following is a specification.

My invention relates to certain new and useful improvements in reel holders, and the object of my invention is to produce a reel which is simple in construction, positive in operation and not likely to get out of order.

A further object of my invention is to improve the pawl of the reel so that it will be cheap to construct and certain in its operation.

With these and other objects in view my invention consists in certain constructions, combinations and arrangements of parts the preferred form of which will be first described in connection with the accompanying drawings and then the invention particularly pointed out in the appended claims.

Referring to the drawings wherein the same part is designated by the same reference numeral wherever it occurs, Figure 1 is a top plan view of a reel holder constructed in accordance with my invention with the cover removed; Fig. 2 is a section of Fig. 1 taken on line 2, 2 of Fig. 1; Fig. 3 is a plan view of a reel with the cap removed; Fig. 4 is a plan view of a modified form of reel holder, the cap being shown removed; Fig. 5 designates the back plate, preferably provided with a narrow upwardly extending flange 6, and 7 designates a cap or cover.

Secured in the central part of the back plate is a post 10 which is shown as secured in position by having a pair of projecting pins 11 on the end thereof, which pass through openings in the back plate, and are then clenched in position as best shown in Fig. 2. Upon this post is mounted the reel proper which, as shown, comprises a pair of plates 12, around the periphery of which are the right angle flanges 13.

14 are tongues struck up from one of the disks and passed through openings in the other disk, the tongues being clenched on to the surface of the other disk, whereby the two disks are held together with their flanges 13 extending in opposite directions, thus forming a drum or reel around which the chain 9 is wound.

15 is a helical spring secured at one end to the post 10 and at the other end to a flange 13. This helical spring is of such a width as to lie within the depression in the side of the reel and operates to cause the chain to be wound upon the reel.

The structure thus far described forms no part of my present invention, the same being fully illustrated and described in my Letters Patent No. 956,242, granted April 26, 1910.

Referring particularly now to the form of my invention disclosed in Figs. 1 and 2, it will be seen that I have placed within the depression in the drum not filled by the helical spring 15 a pawl-carrying part 16 which is not pivoted in the depression but surrounds the post 10. Projecting inwardly from one side of this part 16 is the engaging pawl 17 which preferably, and as shown, is integral with the part 16. The ring structure on each side of the projecting pawl or finger 17 is cut away as shown at 18, in order to permit a pair of guiding studs 20 on the drum to project up on each side of the pawl 17 and guide the same, so that the pawl can only move radially of the drum. Mounted on top of the post 10 is the pawl check 21 which is of any form desired, that shown in this figure having but one shoulder which is adapted to be engaged by the pawl 17, but a pawl check having a plurality of shoulders may be substituted therefor, such pawl check being illustrated in Figs. 3 and 4 and instead of mounting the pawl check on top of the post as illustrated in this figure the same may be mounted on the inner surface of the cover as illustrated in Fig. 4.

In the form of construction shown in Fig. 3 the ring 22 is cut sufficiently thin on the opposite sides of the pawl or finger 23 as to avoid the necessity of forming the notches 18 as shown in Fig. 1. The pawl 23 is mounted to move radially of the drum between the guides 20 as in Fig. 1. The pawl check 24 is shown as provided with five engaging shoulders instead of one as shown in Fig. 1. This pawl check may also be mounted on the under side of the cover instead of on the post, as is the case in Fig. 4.

Referring to Fig. 4, the pawl check 25 is illustrated as being mounted on the inside of the cover 7 and is shown as being provided with two pawl engaging shoulders. The pawl 26 is mounted for radial movement between the guides 20 as heretofore described, but for the rings shown in Figs. 1 and 3 a semicircular part 27 is illustrated as carrying the pawl 26. The function of the part 27 is the same as the rings 16 and 22, namely to give the pawl stability by giving it such a large bearing surface as to prevent its becoming turned or jammed in the guides or between the drum and the cover. This part also insures smooth and certain operation of the pawl by giving it sufficient weight to cause it to move away from the pawl check when the drum is rotated rapidly and to drop into engagement with the pawl check when the drum is stopped or rotated slowly.

I realize that considerable variation is possible in the details of construction and arrangement of parts without departing from the spirit of my invention, and I therefore do not intend to limit myself to the specific form shown and described except as required by the scope of the appended claims.

Having thus described my invention what I claim as new and desire to secure by Letters Patent is:

1. A reel holder comprising a back plate, a post rigidly secured to the back plate, a reel journaled on the post, guides extending up from the reel, a pawl mounted for bodily slidable movement between the guides, a pawl check in position to be engaged by the pawl, and a weighting member extending at each side from the pawl to give the pawl stability and smooth action in moving into and out of engagement with the pawl check when the reel is operated.

2. A reel holder comprising a back plate, a post rigidly secured to the back plate, a reel journaled on the post, a ring provided with an inwardly projecting pawl, a pair of guides extending up from the reel and engaging the sides of the pawl to cause the same to move radially, and a pawl-check in position within the ring and adapted to be engaged by the pawl.

In testimony whereof I affix my signature in presence of two witnesses.

JOHN P. WEAVER.

Witnesses:
O. E. FINK,
ODELL WEAVER.